United States Patent [19]
Watanabe et al.

[11] 3,754,612
[45] Aug. 28, 1973

[54] POWER TRANSMISSION APPARATUS IN A MOTORIZED TWO-WHEEL VEHICLE

[75] Inventors: Yoshinori Watanabe, Tokyo; Keigo Yoshida, Saitama, both of Japan

[73] Assignee: Honda Giken Kogyo Kabushiki Kaisha, Tokyo, Japan

[22] Filed: Nov. 3, 1971

[21] Appl. No.: 195,180

[30] Foreign Application Priority Data
Nov. 6, 1970 Japan................................ 45/97118

[52] U.S. Cl. ................................ 180/33 B, 180/72
[51] Int. Cl. .......................................... B62m 17/00
[58] Field of Search ............. 180/33 A, 33 B, 33 R, 180/32, 64 R, 65 R, 72

[56] References Cited
UNITED STATES PATENTS
2,553,367  5/1961  Gourley ............................. 180/33
3,347,333  10/1967  Edwards ............................ 180/65
3,542,146  11/1970  Hooper ............................. 180/33
3,656,572  4/1972  Mercier ............................ 180/72

Primary Examiner—Kenneth H. Betts
Attorney—Eric H. Waters et al.

[57] ABSTRACT

A motorized two-wheel vehicle has an engine supported from the frame via resilient damping members and the vehicle is provided with a power transmission from the engine to a rear wheel driven member such that the drive of the rear wheel is substantially unaffected by engine vibration. The power transmission comprises a drive member driven from the output shaft of the engine by a universal joint, the drive member being coupled to the driven member by a transmission member such as a chain, the driven member being connected at the free end of a fork having its other end pivotably connected to the frame.

5 Claims, 3 Drawing Figures

Patented Aug. 28, 1973
3,754,612
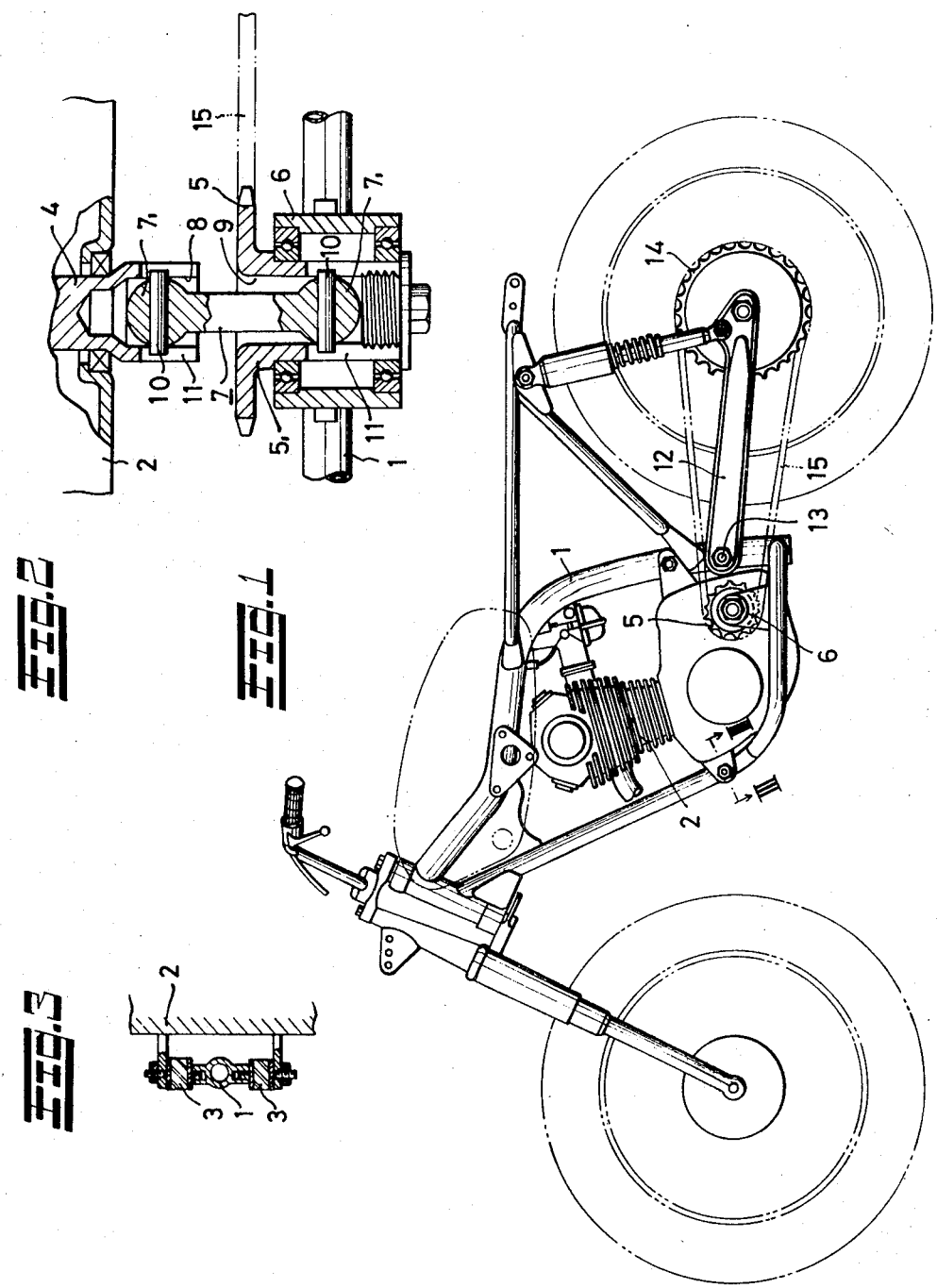

POWER TRANSMISSION APPARATUS IN A MOTORIZED TWO-WHEEL VEHICLE

BACKGROUND OF THE INVENTION

1. Field of the Invention

The invention relates to a power transmission apparatus for the rear wheel of a motorized two-wheel vehicle.

2. Description of the Prior Art

It is conventional for the internal combustion engine of a motorized two-wheel vehicle to be attached to the vehicle frame through a resilient member for preventing the vibration of the engine from being transmitted to the vehicle frame. However, in this case it is common for the driving chain to become loosened by the vibration of the engine.

SUMMARY OF THE INVENTION

An object of the invention is to obviate the foregoing deficiency and to provide stability of control and vibration-free connection between the engine and frame.

According to the invention, a driving member such as a driving sprocket is rotatably attached to the vehicle frame and the driving sprocket is connected through a universal joint to the output shaft of an internal combustion engine attached to the frame through a resilient member, and a power transmission member such as a driving chain is engaged between the driving member and a rear wheel driven member such as a driven sprocket. The rear wheel driven member is mounted on the free end of a rear fork pivotally attached directly to the frame.

BRIEF DESCRIPTION OF THE DRAWING

FIG. 1 is a side elevation view of a motorized two-wheel vehicle with a power transmission apparatus according to the invention, FIG. 2 is an enlarged sectional view of the power transmission apparatus, and FIG. 3 is a sectional view taken along the line III—III in FIG. 1.

DETAILED DESCRIPTION

Referring to the drawing and particularly to FIG. 3, an internal combustion engine 2 is attached to a vehicle frame 1 via resilient members 3, made of rubber or the like, in order to damp vibration from the engine to the frame. A driving sprocket 5 has an integral shaft $5_1$ rotatably supported in a bearing 6 secured to the frame 1. An output shaft 4 of the engine 1 and the driving sprocket 5 are interconnected through a universal joint 7 so that power can be transmitted even when the relative position between the shaft 4 and the sprocket 5 is changed.

The universal joint 7 is illustrated in FIG. 2 and is of a ball-and-socket type in which balls $7_1$ are formed on the opposite ends of a shaft and are mounted in respective bores 8, 9 formed in the output shaft 4 and the shaft $5_1$ of the driving sprocket 5. The balls $7_1$ are coupled in their respective shafts by means of a pin 10 and a slit 11. The universal joint 7 may also be of flexible type using a flexible member of rubber, metal or the like. Numeral 12 denotes a rear fork, numeral 13 denotes a shaft pivotably attaching the rear fork 12 directly to the frame 1 so that the fork 12 is swingable upwards and downwards. Numeral 14 denotes a rear wheel sprocket and numeral 15 denotes a driving chain engaged between the driving sprocket 5 and the rear wheel sprocket 14. It will be easily understood that the chain drive type can be modified to a shaft drive type.

By virtue of the foregoing construction, vibration of the engine 2 is absorbed by the universal joint 7 and does not affect the driving member 5. Accordingly, the relative position between the driving member 5 and the driven member 14 does not change so that the applied condition of the power transmission member 15, i.e., the driving chain, can be always kept constant and consequently the power can be transmitted smoothly. Additionally, since the rear fork 12 is pivotally attached directly to the vehicle frame 1, the rigidity of the pivot portion is not lowered and the control property becomes good and the driving becomes stable. Accordingly, the requirement for the resilient attachment of the engine to minimize vibration transmittance and the requirement for the stability of control are fully met by the construction according to the invention.

What is claimed is:

1. For a two-wheel vehicle having a vehicle frame, an engine supported from the frame and a rear wheel driven from the engine: a power transmission between the engine and the rear wheel comprising a driving member rotatably supported by the frame, a driven member coupled to the rear wheel in driving relation therewith, a power transmission member connecting the driving member and the driven member, means supporting the driven member from the frame for displacement relative thereto, means including a resilient damping member connecting the engine to the frame, said engine having an output shaft, and means comprising a universal joint drivingly connecting the output shaft of the engine and the driving member.

2. The combination as claimed in claim 1 wherein the means supporting the driven member from the frame comprises a fork member having front and rear ends, means pivotably connecting the front end of the fork to the frame, and means connecting the driven member to the rear end of the fork.

3. The combination as claimed in claim 2 wherein the driving and driven members are driving and driven sprockets and the power transmission member is a driving chain.

4. The combination as claimed in claim 2 wherein the universal joint comprises a shaft with integral balls at opposite ends thereof, the output shaft of the engine and the driving member being provided with respective bores, and means connecting the balls in respective bores.

5. The combination as claimed in claim 4 wherein the means connecting the balls in the bores comprises pins in said balls, said pins being slidably accommodated in respective slits provided in the shafts at said bores.

* * * * *